May 11, 1926.
H. S. HUMPHREY
CHECK VALVE
Filed June 6, 1922
1,583,834
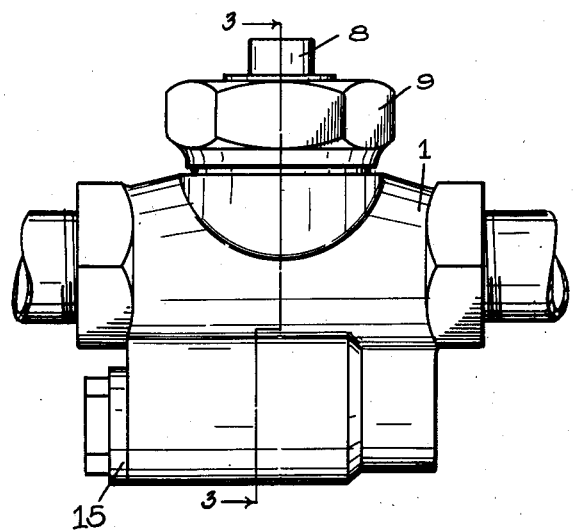
Fig. I.
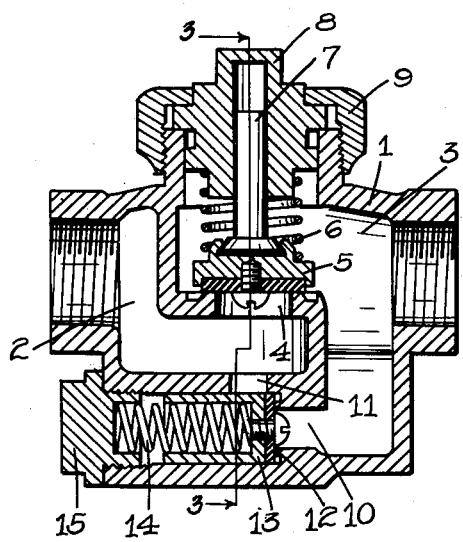
Fig. II.
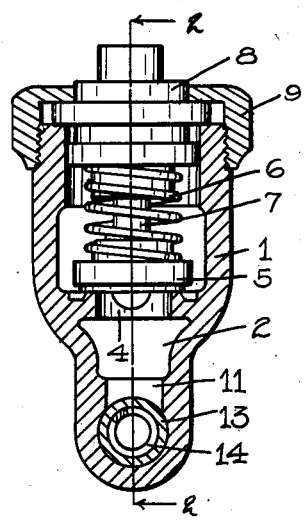
Fig. III.
INVENTOR.
Herbert S. Humphrey
BY Chappell Earl
ATTORNEYS Patented May 11, 1926.

1,583,834

UNITED STATES PATENT OFFICE.

HERBERT S. HUMPHREY, OF KALAMAZOO, MICHIGAN.

CHECK VALVE.

Application filed June 6, 1922. Serial No. 566,326.

This invention relates to improvements in check valves.

My improved check valve is especially designed by me for use in water heaters although desirable for use in numerous other relations.

The main object of this invention is to provide an improved check valve with a return or relief in the event that an undue or excessive pressure exists on the outlet side, such, for instance, as may result from the raising of the temperature of the water.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side view of my improved check valve, the inlet and delivery pipes being partially broken away.

Fig. II is a vertical longitudinal section on a line corresponding to line 2—2 of Fig. III, parts being shown in full lines for convenience in illustration.

Fig. III is a transverse section on a line corresponding to line 3—3 of Figs. I and II, certain parts being shown in elevation.

In the drawing similar reference characters refer to similar parts throughout the several views, and the sectional views are taken looking in the direction of the little arrows at the ends of the section lines.

Referring to the drawing, the valve casing or body 1 is provided with an inlet passage 2 and an outlet passage 3 connected by the port 4. This port 4 is controlled by the check valve 5 seated by the spring 6. This valve 5 is guided by the stem 7 reciprocating in the guide 8 which is held in place by the flanged clamping nut 9. The outlet passage 3 is connected to the inlet passage 2 by a return bypass 10 communicating with the passage 2 through the lateral opening 11. The passage 10 has a valve seat 12 concentric therewith.

The relief valve 13 is preferably cylindrical and is held yieldingly against its seat by the spring 14 supported by the plug 15 threaded into the casing. This valve seat closes across the port or opening 11 so that pressure on the inlet side of the check valve does not act to unseat the relief valve. This relief valve is, however, subject to the pressure on the outlet side of the main or check valve so that in the event of an excess of pressure in the passage 3 the valve 13 is opened connecting the passage 3 with the inlet passage.

My improved check valve is especially designed by me for use in water heaters where the outlet side of the valve is connected with a heating means which, raising the temperature of the water, increases the pressure and provides a safety valve in this connection, the relief being connected to the supply connection so that additional piping of a relief valve is not required. My improved valve is, however, adapted for use in various other relations as will be readily understood by those skilled in the art to which my invention relates.

Having thus described my invention, what I claim as new and desire to secure by Letters Patent, is:

1. The combination of a valve casing having opposed inlet and outlet passages separated by a stepped partition having a main connecting port therein for said passages, said casing having a side opening opposed to said main port and a cylindrical relief valve chamber on the side opposite said opening, said cylinder having a port at its inner end opening to the outlet passage and a side port opening to the inlet passage and alined with said side opening of said casing, a check valve coacting with said main port, a closure cap for said side opening provided with a guide for said check valve, a cylinder relief valve disposed in said relief valve cylinder and adapted when closed to lie across said lateral port thereof and seat against the inner end of the cylinder, a spring for seating said relief valve, and a closure plug for the outer end of said relief valve cylinder.

2. The combination of a valve casing having inlet and outlet passages and a main communicating port therefor, a return bypass around said main port comprising a relief valve cylinder open at its inner end to said outlet passage and communicating with said inlet passage through a lateral port, a main check valve coacting with said main port, a cylindrical relief valve in said relief valve cylinder adapted when closed to lie across said lateral relief port of said by-pass and seat against the end of the cylinder, and a spring for seating said relief valve.

In witness whereof, I have hereunto set my hand and seal.

HERBERT S. HUMPHREY. [L. S.]